United States Patent
Romano, Jr. et al.

(10) Patent No.: US 6,210,474 B1
(45) Date of Patent: Apr. 3, 2001

(54) PROCESS FOR PREPARING AN INK JET INK

(75) Inventors: Charles E. Romano, Jr.; Douglas E. Bugner; Richard C. VanHanehem; James R. Bennett; Dennis E. Smith; Robert A. Guistina, all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/326,064

(22) Filed: Jun. 4, 1999

(51) Int. Cl.$^7$ ................................................. C09D 11/00
(52) U.S. Cl. ........................................ 106/31.6; 106/31.65
(58) Field of Search ................................. 106/31.6, 31.65

(56) References Cited

U.S. PATENT DOCUMENTS

| | | | |
|---|---|---|---|
| 5,679,138 | 10/1997 | Bishop et al. | 106/31.75 |
| 5,755,861 | 5/1998 | Fujioka et al. | 106/31.27 |
| 6,053,438 | * 4/2000 | Romano, Jr. et al. | 241/16 |

\* cited by examiner

Primary Examiner—Helene Klemanski
Assistant Examiner—Veronica F. Faison
(74) Attorney, Agent, or Firm—Harold E. Cole

(57) ABSTRACT

A process for making an ink jet ink comprising:

a) providing an organic pigment dispersion containing a pigment and a carrier;

b) mixing the pigment dispersion with rigid milling media having an average size less than about 100 $\mu$m;

c) introducing the mixture from step b) into a high speed mill;

d) milling the mixture from step c) until a pigment particle size distribution is obtained wherein about 50% by weight of the pigment particles have a particle size less than about 100 nanometers;

e) separating the milling media from the mixture milled in step d); and f) diluting the mixture from step d) to obtain the ink jet ink; wherein the milling media comprises negatively-charged polymeric beads which are crosslinked sufficiently to prevent swelling of the polymeric beads to levels greater than or equal to about 50 volume % within 4 hours at 25° C. in the carrier.

8 Claims, No Drawings

PROCESS FOR PREPARING AN INK JET INK

FIELD OF THE INVENTION

This invention relates to a process for preparing a pigmented ink jet ink which employs a certain milling media.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor light-fastness. When water is used as the carrier, such inks also generally suffer from poor water fastness.

In pigment-based inks, the colorant exists as discrete particles. These pigment particles are usually treated with addenda known as dispersants or stabilizers which serve to keep the pigment particles from agglomerating and settling out of the carrier. Water-based pigmented inks are prepared by incorporating the pigment in the continuous water phase by a milling and dispersing process.

U.S. Pat. No. 5,679,138 relates to a process for preparing an ink jet ink containing nanoparticles of organic pigments. This process employs milling media of polymeric resins such as cross-linked polystyrene. There is a problem with using this media, however, in that the jetting reliability is not as good as one would like it to be.

U.S. Pat. No. 5,755,861 relates to a process for preparing an ink jet ink which has an improved jetting reliability by removing trace metal impurities from the ink. The metal impurities are removed from the ink by a cation-exchange treatment using a cation-exchange resin. There is a problem with this process, however, in that it requires that the ink be passed through a column packed with an ion exchange resin which adds another step and expense to the process.

It is an object of this invention to provide a process for preparing an ink jet ink having an improved jetting reliability. It is another object of the invention to provide a process for preparing an ink jet ink which will remove trace metal impurities without requiring a treatment with an ion exchange resin.

SUMMARY OF THE INVENTION

These and other objects are achieved in accordance with this invention which relates to a process for making an ink jet ink comprising:

a) providing an organic pigment dispersion containing a pigment and a carrier;

b) mixing the pigment dispersion with rigid milling media having an average size less than about 100 μm;

c) introducing the mixture from step b) into a high speed mill;

d) milling the mixture from step c) until a pigment particle size distribution is obtained wherein about 50% by weight of the pigment particles have a particle size less than about 100 nanometers;

e) separating the milling media from the mixture milled in step d); and f) diluting the mixture from step d) to obtain the ink jet ink;

wherein the milling media comprises negatively-charged polymeric beads which are crosslinked sufficiently to prevent swelling of the polymeric beads to levels greater than or equal to about 50 volume % within 4 hours at 25° C. in the carrier.

By use of the invention, an ink jet ink can be obtained which has an improved jetting reliability by removing trace metal impurities without requiring a treatment with an ion exchange resin.

DETAILED DESCRIPTION OF THE INVENTION

As noted above, the milling media which can be used in the invention comprises negatively-charged beads of a polymer which are crosslinked sufficiently to prevent swelling of the beads to levels greater than or equal to 50 volume % within 4 hours at 25° C. in the carrier used for the milling process. This swelling value was obtained from a study of the effectiveness of crosslinked polymers as milling media as disclosed in U.S. Pat. No. 5,902,711.

The negatively-charged groups on the polymer beads which can be used include strong acids, such as those containing sulfonic acid groups, and weak acids, such as those containing carboxylic acid groups. The polymer beads can be used either in the hydrogen or salt form, with the sodium salt form being preferred.

It has been found that crosslinking of negatively-charged polymer beads sufficiently to prevent swelling to levels greater than or equal to 50 volume % within 4 hours at 25° C. in the carrier used for a milling process provides a milling media which unexpectedly both removes undesirable metal ions and reduces the particle size of a pigment without fracturing of the media.

In a preferred embodiment of the invention, the negatively-charged polymeric beads comprise the monovalent salt of sulfonated polystyrene or a polycarboxylic acid, such as methacrylic acid, which has been crosslinked. In another preferred embodiment, the polymer is cross-linked with divinylbenzene.

In general, the milling media of the invention comprise negatively-charged polymeric beads which are of sufficient hardness and friability to enable them to avoid being chipped or crushed during the milling process. The preferred method of making the polymeric beads is by suspension polymerization of acrylic or styrenic monomers, optionally followed by chemical treatment, such as sulfonation, as required to provide the negative charge. Methyl methacrylate, methacrylic acid and styrene are preferred monomers because they are inexpensive, commercially available materials which make acceptable milling media. Other acrylic and styrenic monomers are also useful.

In accordance with the invention, the negatively-charged polymeric beads are sufficiently crosslinked to prevent 50 vol. % swelling of the polymer in the carrier within 4 hours of contact. Any co-monomer with more than one ethylenically unsaturated group can be used in the preparation of the polymeric beads to provide the crosslinking functionality, such as divinylbenzene or ethylene glycol dimethacrylate.

While only a few weight percent crosslinker may be sufficient to make a polymer insoluble in a carrier for an ink jet ink, typically a significantly higher level will be required to prevent substantial swelling of the negatively-charged beads in such carriers. The amount of crosslinking monomer required to be incorporated into the polymer to restrict swelling to less than 50 vol. % will depend upon the composition of the carrier and of the polymeric beads. In general, however, it will be advantageous to provide at least about 10 mole %, more preferably at least 20 mole %, and most preferably at least about 25 mole % crosslinking monomer. Polymers, which contain negative charges or to which negative charges will be added, having the following formula are preferred:

$$(A)_x(B)_y \qquad (I)$$

where A is derived from one or more monofunctional ethylenically unsaturated monomers, B is derived from one or more monomers which contains at least two ethylenically unsaturated groups, x is from 0 to about 90 mole %, and y is from about 10 to 100 mole %, preferably from about 20 to 100 mole %, and most preferably from about 25 to 100 mole %. If less than about 10 mole % crosslinking monomer is included, the polymeric beads may not be sufficiently crosslinked to limit swelling in many carriers to less than 50 vol. %. In general, the higher the mole % of crosslinking monomer in the polymer, the more resistant it will be to swelling in carriers, and the more effective it will be in reducing the pigment particle size without contaminating the ink with fractured polymer beads.

Suitable ethylenically unsaturated monomers which can be used as component A may include, for example, the following monomers and their mixtures: acrylic monomers, such as acrylic acid, or methacrylic acid, and their alkyl esters such as methyl methacrylate, ethyl methacrylate, butyl methacrylate, ethyl acrylate, butyl actylate, hexyl acrylate, n-octyl acrylate, lauryl methacrylate, 2-ethylhexyl methacrylate, nonyl acrylate, benzyl methacrylate; the hydroxyalkyl esters of the same acids, such as, 2-hydroxyethyl acrylate, 2-hydroxyethyl methacrylate, and 2-hydroxypropyl methacrylate; the nitriles and amides of the same acids, such as, acrylonitrile, methacrylonitrile, acrylamide and methacrylamide; vinyl compounds, such as, vinyl acetate, vinyl propionate, vinylidene chloride, vinyl chloride, and vinyl aromatic compounds such as styrene, styrene sulfonic acid, t-butyl styrene, ethylvinylbenzene, vinyl toluene; dialkyl esters, such as, dialkyl maleates, dialkyl itaconates, dialkyl methylene-malonates and the like. Preferably, monomer A is styrene, styrene sulfonic acid, vinyl toluene, ethylvinylbenzene, methacrylic acid or methyl methacrylate. Most preferably, monomer A is styrene, styrene sulfonic acid, methacrylic acid or ethylvinylbenzene.

Suitable ethylenically unsaturated monomers which can be used as component B are monomers which are polyfunctional with respect to the polymerization reaction, and may include, for example, the following monomers and their mixtures: esters of unsaturated monohydric alcohols with unsaturated monocarboxylic acids, such as allyl methacrylate, allyl acrylate, butenyl acrylate, undecenyl acrylate, undecenyl methacrylate, vinyl acrylate, and vinyl methacrylate; dienes such as butadiene and isoprene; esters of saturated glycols or diols with unsaturated monocarboxylic acids, such as, ethylene glycol diacrylate, ethylene glycol dimethacrylate, triethylene glycol dimethacrylate, 1,4-butanediol dimethacrylate, 1,3-butanediol dimethacrylate, pentaerythritol tetraacrylate, trimethylol propane tri-methacrylate and polyfunctional aromatic compounds such as divinylbenzene and the like. Preferably, monomer B includes ethylene glycol dimethacrylate, ethylene glycol diacrylate, 1,4-butanediol dimethacrylate or divinylbenzene. Most preferably, monomer B is divinylbenzene.

As to divinylbenzene, although available as pure monomer for laboratory use, it is most commonly sold commercially as a mixture of divinylbenzene and ethylvinylbenzene, available, for instance, from Dow Chemical Company as DVB-55 (typical assay 55.8% divinylbenzene and 43.0% ethylvinylbenzene) or DVB-HP (typical assay 80.5% divinylbenzene and 18.3% ethylvinylbenzene). For polymeric milling media crosslinked with divinylbenzene used in accordance with preferred embodiments of the invention, it is generally preferable to include at least about 50 wt % of commercially available (55% assay) divinylbenzene. This provides at least about 24 mole % crosslinking monomer. A copolymer with 80 wt % commercial (55% assay) divinylbenzene is especially preferred, providing about 42 mole % crosslinking monomer.

The negatively-charged polymeric beads used in accordance with this invention can be made by various well-known techniques in the art, such as, for example, crushing, grinding or pulverizing of polymer down to the desired size, emulsion polymerization, dispersion polymerization, suspension polymerization, solvent evaporation from polymer solution dispersed as droplets, and the like (see, for example, Arshady, R. in "Colloid & Polymer Science", 1992, No 270, pages 717–732; G. Odian in "Principles of Polymerization", 2nd Ed. Wiley(1981); and W. P. Sorenson and T. W. Campbell in "Preparation Method of Polymer Chemistry", 2nd Ed, Wiley (1968)). A preferred method of preparing polymer beads in accordance with this invention is by a limited coalescence technique where polyaddition polymerizable monomer or monomers are added to an aqueous medium containing a particulate suspending agent to form a discontinuous (oil droplet) phase in a continuous (water) phase. The mixture is subjected to shearing forces, by agitation, homogenization and the like to reduce the size of the droplets. After shearing is stopped an equilibrium is reached with respect to the size of the droplets as a result of the stabilizing action of the particulate suspending agent in coating the surface of the droplets and then polymerization is completed to form an aqueous suspension of polymer beads. This process is described in U.S. Pat. Nos. 2,932,629; 5,279,934; and 5,378,577; the disclosures of which are incorporated herein by reference.

Removal of residual monomers from the polymeric media after synthesis may be desirable, and can be accomplished by any number of methods common to polymer synthesis such as thermal drying, stripping by inert gases such as air or nitrogen, solvent extraction or the like. Drying and stripping processes are limited by the low vapor pressure of the residual monomers and large bead sizes resulting in long diffusion paths. Solvent extraction is therefore preferred. Any solvent can be used such as acetone, toluene, alcohols such as methanol, alkanes such as hexane, supercritical carbon dioxide and the like. Acetone is preferred. While solvents which are effective in removing residual monomers typically dissolve the polymer made from the monomer, or make the polymer sticky and difficult to handle, crosslinked polymers in accordance with the invention are advantageously generally made insoluble in the solvent which has an affinity for the monomer.

The polymeric beads typically will have a density from 0.9 to 3.0 g/cm$^3$ although densities outside this range are also possible. Higher density beads are preferred inasmuch as it is believed that these provide more efficient particle size reduction.

The polymeric milling media beads used in the invention preferably are substantially spherical in shape. For fine grinding, the polymeric milling media beads preferably have a mean (volume average) size of less than about 100 μm in size, more preferably less than about 75 μm and most preferably less than or equal to about 50 μm in the unswollen state. Excellent pigment particle size reduction has been achieved with media having a size of about 25 μm, and media milling with media having a size of 5 μm or less is contemplated.

Any of the known organic pigments can be used to prepare ink jet inks in accordance with the process of the invention. Pigments can be selected from those disclosed, for example, in U.S. Pat. Nos. 5,026,427; 5,085,698; 5,141,556; 5,160,370 and 5,169,436, the disclosures of which are hereby incorporated by reference. The exact choice of pigment will depend upon the specific color reproduction and image stability requirements of the printer and application. For four-color printers, combinations of cyan, magenta, yellow and black (CMYK) pigments are used. An exemplary four color set is a cyan pigment, bis(phthalocyanyl-alumino) tetraphenyldisiloxane, quinacridone magenta (pigment red 122), pigment yellow 74 and carbon black (pigment black 7).

Carriers which may be used in the invention are polar solvents including water, alcohols, ketones, etc. Water is preferred.

A humectant is added to the composition prepared by the process of the invention to help prevent the ink from drying out or crusting in the orifices of the ink jet printhead. As noted above, the humectant is a polyhydric alcohol or a nitrogen-containing cyclic compound.

Polyhydric alcohol humectants useful in the composition prepared by the process of the invention include, for example, ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol. In a preferred embodiment, a mixture of glycerol and diethylene glycol is employed, especially at a concentration of between 15 and 30 wt. %.

Examples of nitrogen-containing cyclic compounds useful as humectants in the ink composition prepared by the process of the invention include, for example, pyrrolidone, N-methyl-2-pyrrolidone, and 1,3-dimethyl-2-imidazolidinone.

A co-solvent can also be employed in the composition prepared by the process of the invention. The selection of a co-solvent depends on the requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) esters, such as ethyl acetate, ethyl lactate, ethylene carbonate and propylene carbonate; and (4) sulfur-containing compounds such as dimethyl sulfoxide and tetramethylene sulfone.

Ink Preparation

A preferred method for making the inks prepared by the process of the invention is disclosed in U.S. Pat. No. 5,679,138, the disclosure of which is hereby incorporated by reference. In general, it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. The mill grind can be diluted with either additional water or water-miscible solvents to make a mill grind of the desired concentration. By dilution, the ink is adjusted to the desired viscosity, color, hue, saturation density and print area coverage for the particular application.

Jet velocity, separation length of the droplets, drop size and stream stability are greatly affected by the surface tension and the viscosity of the ink. Pigmented ink jet inks suitable for use with ink jet printing systems should have a pH in the range of 5 to 9. Anionic and cationic surfactants may be used in the composition of the invention as disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosities for ink jet inks are no greater than 20 centipoise, and preferably in the range of about 1.0 to about 15.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device.

A penetrant (0–10 wt. %) may also be added to the ink composition prepared by the process of the invention to help the ink penetrate the receiving substrate, especially when the substrate is a highly sized paper. A preferred penetrant for the inks prepared by the process of the present invention is n-propanol at a final concentration of 1–6 wt. %.

A biocide (0.01–1.0 wt. %) may also be added to prevent unwanted microbial growth which may occur in the ink over time. A preferred biocide for the inks prepared by the process of the present invention is Proxel® GXL (Zeneca Colours Co.) at a concentration of 0.05–0.5 wt. %. Additional additives which may optionally be present in ink jet inks include thickeners, conductivity enhancing agents, anti-kogation agents, drying agents, and defoamers.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance with digital data signals. An ink droplet is not generated and ejected through the orifices of the print head unless it is needed.

The following examples illustrate the utility of the present invention.

EXAMPLES

Preparation of Polymeric Milling Media

Inhibitor is removed from a mixture of 1980 g of styrene and 495 g divinylbenzene (55% grade from Dow Chemical Co.) by slurrying with 100 g of basic aluminum oxide for 15 minutes followed by filtering off the aluminum oxide. 65.7 g of benzoyl peroxide (sold as Lucidol 75® by Pennwalt Corp) are then dissolved in this uninhibited monomer mixture. In a separate vessel is added 3,300 gm of demineralized water to which is added 13.8 g of poly(2-methylaminoethanol adipate), and 22.4 gm of Ludox TM®, a 50% colloidal suspension of silica sold by DuPont Corp. The uninhibited monomer mixture is added to the aqueous phase and stirred to form a crude emulsion. This is passed twice through a Gaulin colloid mill operated at 4.54 l/minute feed rate, 3,300 rev/min and gap setting of 0.0254 cm. To this is added a solution of 8.2 g gelatin dissolved in 246 g of demineralized water. The mixture is heated to 67° C. for 16 hours followed by heating to 85° C. for 4 hours. The resulting solid beads are sieved through a 145 mesh sieve screen to remove oversized beads and the desired beads which pass through the screen are collected by filtration.

Preparation of Sulfonated Polymeric Milling Media According to the Invention To a 5 liter, 3-neck flask equipped with a condenser and thermometer was charged 3.23 kg of 96% sulfuric acid and 500 g of the above polymeric media. The mixture was stirred moderately with an air driven stirrer and heated to 116° C. for 24 hours using a heating mantle. The temperature was then increased to 120° C. for 2 hours, then 133° C. for 1 hour and then 144° C. for 3 hours.

The slurry was allowed to cool, then quenched by pouring over 3.2 kg of ice contained in a 12-liter flask. The sulfonated resin was stirred and allowed to settle and the liquors were decanted. Eight liters of demineralized water was added back to the sulfonated resin, stirred and settled and the acidic liquors decanted. The sulfonated resin was then slurried in 8 liters of demineralized water and filtered in a Buchner funnel. Two additional 4 liter demineralized water displacement washes were done on the cake to insure the final water liquors were >pH 5.

Conversion of Sulfonated Polymeric Milling Media to the Sodium Salt

Three liters of demineralized water and 36 ml of 50 weight % caustic solution was charged to a 4 liter beaker which was stirred magnetically on a hot plate at 25° C. Then, 439 grams of the above sulfonated polymeric milling media was sifted into the caustic solution and allowed to stir 48 hours.

The slurry was then filtered on a Buchner funnel containing filter paper. Four 4-liter displacement washes were done on the cake to lower the pH to 5. After the final wash the cake was drawn down to a dry cake of approximately 2 weight % volatiles.

Preparation of Carboxylic Acid-Containing Polymeric Milling Media

Inhibitor is removed from 792 g divinylbenzene (55% grade from Dow Chemical Co.) by slurrying with 25 g of basic aluminum oxide for 15 minutes followed by filtering off the aluminum oxide. To the inhibitor-removed divinylbenzene are add 198 g methacrylic acid followed by 26.3 g of benzoyl peroxide (Lucidol 75® (Pennwalt Corp). In a separate vessel is added 3,320 g of demineralized water to which is added 5.78 g of poly(2-methylaminoethanol adipate) and 9.4 gm of Ludox TM®, a 50% colloidal suspension of silica sold by DuPont Corp. The monomer mixture is added to the aqueous phase and stirred to form a crude emulsion. This is passed through a Gaulin colloid mill operated at 9.5 l/minute feed rate, 3,300 rev/min and gap setting of 0.038 cm. To this milled mixture is added 230 g of a 1.5% polyvinyl alcohol solution. The mixture is heated to 61° C. for 16 hours followed by heating to 80° C. for 2 hours and finally 90° C. for 3 hours. The resulting solid beads are sieved through a 140 mesh sieve screen to remove oversized beads and the desired beads which pass through the screen are collected by filtration.

The beads from above are re-slurried in 2L of 1N NaOH solution and stirred for 1 hour. The beads are filtered and redispersed in 2L of 0.1N NaOH solution and stirred overnight. The beads are filtered and successively re-slurried in 2L of demineralized water until the filtrate pH is <8.5. The beads are then filtered and dried in a vacuum oven overnight at 50 C.

EXAMPLE 1

Control Mill Grind 1

A yellow dispersion was prepared by mixing the following components:

25.0 g Hansa® Brilliant Yellow 5GX-02 pigment (p.y. 74) Hoechst Chem. Co.)

3.0 g oleoyl methyl taurine (OMT) potassium salt 97 g high purity water 150 g 50 µm polymeric milling media The above components were mixed in a 1 liter water cooled double walled vessel obtained from BYK-Gardner and then milled using a high energy laboratory dispersator, Model 90 (Premier Mill Corp.) equipped with a 4.0 cm Cowles-type blade rotating at 5,000 rev/min for 30 min. The milling was stopped and held at ambient temperature overnight. After the hold, the milling was continued for 45 min at 8,600 rev/min. The dispersion was diluted with high purity water to about 13% pigment concentration and then filtered through a 10–20 µm KIMAX® Buchner Funnel (VWR Scientific Products) to remove the milling media.

The particle size of the dispersion was measured using a MicroTrac Ultrafine Particle Analyzer (UPA) (Table 1).

Control Mill Grind 2

A yellow dispersion was prepared by mixing the following components:

15.0 g Hansa® Brilliant Yellow 5GX-02 pigment (p.y. 74) Hoechst Chem. Co.)

1.9 g oleoyl methyl taurine (OMT) sodium salt 58 g high purity water 90 g 420–1190 µm Dowex® Ion Exchange Beads (JT Baker Cat. #1928-01), The above components were mixed in a 0.5 liter water cooled double walled vessel obtained from BYK-Gardner and then milled using the dispersator of Example 1 with the blade rotating at 4,000 rev/min. After milling for 1.25 hr, a sample of the dispersion was removed. Examination by optical microscopy of the Dowex® Ion Exchange Beads recovered from this milling experiment revealed a significant amount of fractured beads and small bead shards. Since the beads were fractured, the composition was no longer useful so that the milling was discontinued.

Invention Mill Grind 1

A yellow dispersion was prepared as in Example 1 except that it contained only 0.5 g OMT and the milling media was the sodium salt of the sulfonated polymer.

The above components were mixed in a 1 liter vessel and milled as in Example 1. After the overnight hold, 2.5 g of OMT was added and the milling was continued for 45 min at 8,600 rev/min. The dispersion was diluted with high purity water and then filtered as in Example 1 to remove the milling media.

The particle size of the dispersion was measured as in Example 1. Examination by optical microscopy of the sodium salt of the sulfonated polymeric milling media recovered from this milling experiment revealed no change in their physical appearance.

Invention Mill Grind 2

A yellow dispersion was prepared and measured as in Example 1 except that the carboxylic acid-containing polymeric milling media was used.

The above components were mixed in a 1 liter vessel as in Example 1 and then milled using the dispersator of Example 1. The milling was performed at 5,000 rev/min for 10 min and 7,000 rev/min for 30 minutes. The milling was stopped and held at ambient temperature overnight. After the hold, the milling was continued for 45 min at 8,600 rev/min. The dispersion was diluted with high purity water and then filtered as in Example 1 to remove the milling media.

The particle size of the dispersion was measured as in Example 1. Examination by optical microscopy of the carboxylic acid-containing polymeric media recovered from this milling experiment revealed no change in their physical appearance.

TABLE 1

| Mill Grind | Milling Media | Particle Size (nm) |
| --- | --- | --- |
| 1 (Control) | Standard Polymeric Beads | 13 |
| 2 (Control) | Dowex ® Ion Exchange Beads | * |
| 1 (Invention) | Sulfonated Polymeric Beads | 12 |
| 2 (Invention) | Carboxylic Acid-Containing Polymeric Beads | 16 |

*Milling discontinued

The above results show that pigment dispersions made with negatively-charged polymeric beads of the invention have a similar particle size to dispersions made with standard polymeric beads.

Elemental Analysis of Pigment Dispersion

Elemental analyses were obtained by first drying an aliquot of the mill grinds of Examples 1–3 with a stream of nitrogen gas until all visible water was evaporated and then vacuum drying the solids at 50° C. for 16 hours. These solids were analyzed by Inductively Coupled Plasma-Atomic Emission Spectroscopy (ICP-AES) by conventional sample preparation. The samples were prepared by digesting them with a mixture of perchloric and nitric acids and by dry ashing them in a muffle furnace.

TABLE 2

| | Elemental Analysis | | |
| --- | --- | --- | --- |
| Element | Concentration of Element in Mill Grind 1 (Control) ($\mu g/g$) | Concentration of Element in Mill Grind 1 (Invention) ($\mu g/g$) | Concentration of Element in Mill Grind 2 (Invention) ($\mu g/g$) |
| Ca | 410 | 80 | 290 |
| Fe | 82 | 46 | 36 |
| Mg | 72 | 68 | 59 |

The above results show that milling of the pigment with the polymeric beads of the invention reduced the amount of various elements in comparison to the control beads.

EXAMPLE 2

Preparation of Inks

The inks consist of the following: sufficient mill grind Control 1, Invention 1 or Invention 2 to give a pigment concentration in the ink equal to 2.5 g of pigment per 100 g of ink, 10 g of 3 wt. % aqueous Strodex PK 90® surfactant, 16 g of diethylene glycol, 2.5 g of 10 wt. % aqueous triethanolamine and sufficient water to make 100 g of ink total.

The above inks were tested for jetting reliability in an apparatus composed of three sections including 1) the electronics necessary to drive a cartridge and measure individual heater resistance, 2) an electronic balance to measure the amount of jetted ink, and 3) a microscope with a video camera to observe the operating nozzle and jet. The electronics are constructed in such a way that a single nozzle of the 104 nozzles in a Kodak 2042/2060 ink jet wide format printer head is addressed, hence the description of a single nozzle apparatus.

By monitoring the amount of ink jetted prior to failure, a comparative estimate of reliability performance is obtained. The volume of ink delivered prior to failure as well as the instantaneous drop volume is obtained from the balance measurements. The microscope allows visual assessment of performance. A "bad" performing ink typically delivers less than 0.5 ml on average. A "good" performing ink typically delivers more than 1.0 ml on average.

The test was performed three times and the following average result was obtained:

TABLE 3

| Ink | Avg. Volume (mL) |
| --- | --- |
| 1 (Control) | 0.13 |
| 1 (Invention) | 2.28 |
| 2 (Invention) | 1.16 |

The above results show that inks made with the polymeric beads of the invention perform more reliably than the control beads.

EXAMPLE 3

The volume change of one-half milliliter of the above beads was measured after immersion in water at 25° C. for four hours. The following results were obtained:

TABLE 4

| Beads | Volume % Swell |
|---|---|
| Polymeric Milling Media (control 1) | 0 |
| Dowex ® Ion Exchange Resin (control 2) | 169 |
| Sulfonated Polymeric Milling Media, Sodium Salt (Invention 1) | 0 |
| Carboxylic Acid-Containing Polymeric Milling Media (Invention 2) | 0 |

The above results show that the beads of the invention swell less than 50 volume % within 4 hours at 25° C. in water.

The invention has been described in detail with particular reference to certain preferred embodiments thereof, but it will be understood that variations and modifications can be effected within the spirit and scope of the invention.

What is claimed is:

1. A process for making an ink jet ink comprising:
   a) providing an organic pigment dispersion containing a pigment and a carrier;
   b) mixing said pigment dispersion with rigid milling media having an average size less than about 100 μm;
   c) introducing the mixture from step b) into a high speed mill;
   d) milling the mixture from step c) until a pigment particle size distribution is obtained wherein about 50% by weight of the pigment particles have a particle size less than about 100 nanometers;
   e) separating said milling media from the mixture milled in step d); and
   f) diluting the mixture from step d) to obtain the ink jet ink; wherein said milling media comprises negatively-charged polymeric beads which are crosslinked sufficiently to prevent swelling of said polymeric beads to levels greater than or equal to about 50 volume % within 4 hours at 25° C. in said carrier.

2. The process of claim 1 wherein said polymeric beads comprise sulfonated polystyrene.

3. The process of claim 2 wherein said polymeric beads comprise the monovalent salt of sulfonated polystyrene.

4. The process of claim 1 wherein said polymeric beads are cross-linked with divinylbenzene.

5. The process of claim 1 wherein said polymeric beads comprise a polymeric carboxylic acid.

6. The process of claim 5 wherein said polymeric carboxylic acid is methacrylic acid.

7. The process of claim 6 wherein said methacrylic acid is cross-linked with divinylbenzene.

8. The process of claim 5 wherein said polymeric beads comprise a monovalent salt of methacrylic acid.

* * * * *